Patented June 20, 1933

1,915,018

UNITED STATES PATENT OFFICE

UDO EHRHARDT, OF BITTERFELD, GERMANY, ASSIGNOR TO I. G. FARBENINDUSTRIE AKTIENGESELLSCHAFT, OF FRANKFORT-ON-THE-MAIN, GERMANY

THAWING COMPOSITION

No Drawing. Application filed July 16, 1930, Serial No. 468,458, and in Germany March 3, 1930.

The present invention relates to a new thawing composition and a method of producing and applying same.

For the purpose of removing crusts of ice from various, particularly metallic, articles exposed to the open air, such as the points of railway-shunts etc. it is old to make use of the thawing properties of certain salts, particularly of sodium chloride. However, the application of this agent is accompanied by the drawback that the solutions of that salt similar to the solutions of many other chlorides has a strong corroding effect on iron and thus considerably enhances the natural rusting process. The same considerations have hitherto discouraged any attempts to employ the highly soluble chlorides of metals which are less basic than the alkali metals, i. e. calcium chloride, as their corroding action was feared to be still stronger.

An object of the present invention is to provide a thawing composition which although substantially consisting of anhydrous magnesium chloride not only has no perceptible corroding effect when applied to articles made of iron and similar metals but also causes an exceedingly smooth and rapid thawing of the ice crusts and is in these respects even highly superior to the thawing agent hitherto most widely employed, namely sodium chloride.

According to the present invention, anhydrous magnesium chloride which is obtained by crystallization of molten anhydrous magnesium chloride is applied in mixture with small amounts (preferably ranging about 1 percent) of an alkali chromate, the latter component acting as an anti-rusting agent. I have found that an anhydrous magnesium chloride which is particularly suitable for thawing purposes is obtained by causing a comparatively rapid crystallization of the salt from the molten state, as the salt thus crystallized, on its disintegration by mechanical means, i. e. by crushing, forms grains of a tablet- or leaf-like shape. This form of the crystals is not only particularly suitable for dissemination but also enables close contact with the particles of snow and ice causing its dissolution. The high speed of thawing resulting from these circumstances is still further enhanced by the exceedingly low fusion point of the eutectic of magnesium chloride and ice and the high value of its heat of hydration which amounts to about 33 cal. per mol. Consequently there is no danger of solid crusts of hydrates being formed during the thawing process which would impair the result, such as is the case with other chlorides inclining to form solid hydrates even at comparatively low temperatures.

So as to obtain the anhydrous magnesium chloride in the tablet- or leaf-like form I preferably cast the molten technically pure anhydrous magnesium chloride into moderately preheated iron pans of rectangular or circular shape consisting of sheet iron and having a thickness of about 5 mms. and an area of about 1 or 2 square meters. In these pans the salt layer having a thickness of about 15 centimeters is allowed to solidify and is then broken up into lumps. The lumps are then ground in a mill working on the mill stone principle, the disks having a roughened surface, so as to separate the tablet shaped grains having a length not exceeding about 2 millimeters from each other. The resulting product is then intimately mixed with the required quantity of finely pulverized alkali chromate and is then ready for use.

I claim:

1. A thawing composition substantially consisting of an intimate mixture of grains of crystallized anhydrous magnesium chloride having the shape of thin tablets of a length not exceeding about 2 millimeters, and about one percent of a finely powdered alkali chromate.

2. A method of producing a thawing composition which comprises causing molten anhydrous magnesium chloride to solidify in the form of thin tablet-shaped crystals by subjecting a layer of moderate thickness of molten anhydrous magnesium chloride to crystallization in preheated open metal pans, then grinding the crystal mass so as to separate the individual crystals from each other and finally admixing a small percentage of a finely pulverized alkali chromate with said magnesium chloride.

In testimony whereof, I affix my signature.

UDO EHRHARDT.